United States Patent [19]

Plumb

[11] 3,865,859

[45] Feb. 11, 1975

[54] ORGANO-SILICON COMPOUNDS

[75] Inventor: John Beckett Plumb, Manchester, England

[73] Assignee: Imperial Chemical Industries Limited, London, England

[22] Filed: Aug. 24, 1972

[21] Appl. No.: 283,288

[30] Foreign Application Priority Data
Aug. 31, 1971 Great Britain.................... 40534/71

[52] U.S. Cl..... 260/448.8 R, 252/358, 260/448.2 B
[51] Int. Cl. ............................................... C07f 7/18
[58] Field of Search...260/448.8 R, 448.2 B, 448.8 A

[56] References Cited
UNITED STATES PATENTS

| | | | |
|---|---|---|---|
| 2,834,748 | 5/1958 | Bailey et al. | 260/448.8 R X |
| 3,170,894 | 2/1965 | Brown et al. | 260/448.8 R X |
| 3,172,899 | 3/1965 | Bailey | 260/448.2 B |
| 3,194,773 | 7/1965 | Hostettler | 260/448.8 R X |
| 3,272,762 | 9/1966 | Ibbotson et al. | 260/448.8 R X |
| 3,480,583 | 11/1969 | Bailey et al. | 260/448.8 R X |
| 3,555,063 | 1/1971 | Nakajima et al. | 260/448.8 R |
| 3,600,418 | 8/1971 | Bailey et al. | 260/448.8 R |
| 3,629,310 | 12/1971 | Bailey et al. | 260/448.8 R |
| 3,686,254 | 8/1972 | Morehouse | 260/448.2 B |
| 3,723,491 | 3/1973 | Rossmy et al. | 260/448.2 B |

Primary Examiner—Daniel E. Wyman
Assistant Examiner—Paul F. Shaver
Attorney, Agent, or Firm—Cushman, Darby & Cushman

[57] ABSTRACT

New siloxyalkylene polymers prepared by reacting organochloro-silanes or alkoxysilanes with alkylene or oxyalkylene diols and which are useful as surface active agents particularly for suppression of foam formation in aqueous systems e.g., in fermentation processes.

8 Claims, No Drawings

ORGANO-SILICON COMPOUNDS

This invention relates to new and useful organosilicon compounds and to the use of such compounds for the suppression of foam formation.

A wide variety of organosilicon compounds is known and many of these including large numbers of siloxane/oxyalkylene copolymers have been used for the suppression of foam in various media. Many of these compounds are not entirely satisfactory, however, especially when used for the suppression of foam formation in aqueous systems such as are used in various fermentation processes.

According to the present invention a new and useful class of organosilicon compounds comprises compounds of the general formula $$(R_aSi)_xO_{x(4-a)} [(C_nH_{2n}O)_yH]_zA_{x(4-a)-z/2}$$

where $R$ is a substituted or unsubstituted monovalent hydrocarbyl group, $A$ is the group $[(C_nH_{2n}O)_{y-1}C_nH_{2n}]$ or $C_5H_{10}$ where $n$ is an integer from 2 to 4 and $y$ is an integer from 1 to 5, $a$ is 0 or 1, $x$ is an integer from 1 to 100 and $z$ is an integer which when $a$ is 1 is not greater than $x + 2$ and when $a$ is O is not greater than $2x + 2$.

The substituted or unsubstituted monovalent hydrocarbyl group R may be an alkyl, aryl, aralkyl, alkaryl, alkenyl, cycloalkyl or cycloalkenyl group, preferably containing not more than 10 carbon atoms, or such a group containing substituents selected from halogens and cyano groups. Suitable groups include, for example, methyl, ethyl, propyl, isobutyl, vinyl, phenyl, tolyl and benzyl groups. In many cases it is preferred that the groups R are methyl or phenyl groups.

A wide variety of groups A may be present. These include, for example,

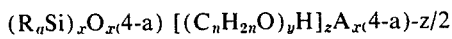

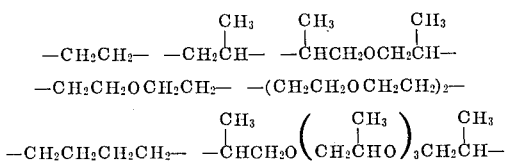

While $a$ may be 0 or 1, it is in many cases preferred that it be 1.

$x$ may as stated vary from 1 to 100. It is, however, in general preferred that it be from 1 to 10 while for some purposes it is especially preferred that $x$ be 1.

While $y$ may be from 1 to 5 it is preferred in many cases that it be 1 or 2.

The values of $z$ may vary widely it being necessary only that when $a$ is 1 it be not greater than $x + 2$ and that when $a$ is 0 it be not greater than $2x + 2$. It is, however, frequently preferred that it be not less than $x$.

The products of the invention may be prepared by any one of a number of methods. One convenient method is to react silicon tetrachloride or an organotrichlorosilane of the formula $RSiCL_3$ with a suitable dihydroxy compound. Suitable compounds are the diols corresponding to the groups A, for example, $HOCH_2CH(CH_3)OH$, $HOCH(CH_3)CH_2OCH_2CH(CH_3)OH$, $HOCH_2CH_2OCH_2CH_2OH$, $HOCH_2CH_2OH$, $HO(CH_2CH_2O)_3H$, $HO(CH_2)_4OH$, $HO[CH(CH_3)CH_2O]_6H$ and $HOC(CH_3)_2C(CH_3)_2OH$. The reaction is preferably carried out by adding the chlorosilane to the dihydroxy compound which is preferably dissolved in an inert solvent. Suitable solvents which may be used include, for example, toluene, benzene, xylene, diethyl ether and dibutyl ether. If desired, the reaction may be carried out in the presence of an acid acceptor to combine with the hydrogen chloride evolved during the reaction. Suitable acid acceptors include, for example, organic bases such as pyridine, N,N-diethylaniline, triethylamine and tri-n-butylamine and ammonia. Acid acceptors are, however, not always necessary and in many cases complete removal of the hydrogen chloride can conveniently be achieved by purging the reaction mixture with a stream of an inert gas such as nitrogen. When an acid acceptor is employed, it is preferred to carry out the process in the presence of a solvent. Heat is evolved and cooling of the reaction mixture is desirable during the process of addition of the chlorosilane to the dihydroxy compound in order to maintain the temperature of the reaction mixture below about 40°–50°C. The reaction mixture is then heated, usually to its reflux temperature, to complete the reaction, after which the precipitated amine hydrochloride is filtered off and the product recovered by removal of the solvent by distillation.

When no acid acception is employed, the silicon tetrachloride or the organotrichlorosilane is added to the solution of the dihydroxy compound, again maintaining the temperature of the reaction mixture below about 40°–50°C during the addition. Thereafter the solution is heated gradually to reflux temperature and purged with a stream of a dry inert gas, such as nitrogen, until acid-free. The product is then recovered by distillation of the solvent.

In another method a tetraalkoxysilane or organotrialkoxysilane is reacted with a suitable dihydroxy compound in a trans-esterification reaction. Preferably the alkoxysilane is so chosen that the free alcohol produced is of lower boiling point than the dihydroxy compound used. The reactants are heated together, if desired in the presence of a solvent and the free alcohol produced removed by distillation, if necessary under reduced pressure. If desired an acidic catalyst, such as, for example, trifluoroacetic acid or monochloroacetic acid alone or in presence of an alkali metal salt thereof, for example, trifluoroacetic acid with potassium trifluoroacetate or potassium acetate or a basic catalyst such as potassium hydroxide or a potassium silanolate, $KO[Si(CH_3)_2O]_bK$ (where $b$ is a positive integer), may be employed in the trans-esterification reaction. The alkoxysilanes used are preferably of the type $Si(OR')_4$ or $RSi(OR')_3$ where $R'$ is a lower alkyl group such as methyl, ethyl, iropropyl or n-butyl group. When such alkoxysilanes are employed, removal of the evolved alcohol R'-OH by distillation, if necessary azeotropic with a suitable solvent such as toluene or xylene occurs readily, and in such cases a catalyst for the trans-esterification reaction is not usually necessary.

The ratio solvent to reactants employed in either of the above processes is not critical, equal parts by weight of solvent and reactants being satisfactory in most cases, but more or less may be employed if desired. When removal of alcohol by azeotropic distillation with the solvent is carried out in the trans-esterification process, fresh solvent may be added as the azeotrope is removed to maintain an approximately constant solution concentration.

The molar ratio of dihydroxy compound to chlorosilane or alkoxysilane employed in these processes may vary widely. If the molar ratio of dihydroxy compound to silicon compound is 3:1 or greater, in the use of trichlorosilanes or trialkoxysilanes, the product will consist almost exclusively of a compound of the structure $RSi[(OC_nH_{2n})_vOH]_3$ or $C_5H_{10}$. As the molar ratio of dihydroxy compound to silicon compound employed is decreased to a value of slightly greater than 1.5:1, the average number of cross links per silicon atom will increase, and the average number of -O-R''-OH groups (where R'' is the group $-(C_nH_{2n}O)_{v-1}C_nH_{2n}-$ or $C_5H_{10}$) attached to any silicon atom in the product will decrease. When the limiting molar ratio of reagents of 1.5:1 is reached, the resultant product will contain no -O-R''-OH groups attached to silicon, but will consist substantially of a mixture of molecular species of average composition

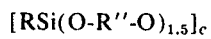

[$RSi(O-R''-O)_{1.5}]_c$ where c is a positive integer greater than 1. Similarly in the case where silicon tetrachloride or a tetraalkoxysilane is used as a starting material if the molar ratio of dihydroxy compound to silicon compound is 4:1 or greater, the product will consist almost exclusively of a compound of the structure $Si[(OC_nH_{2n})_vOH]_4$ or $C_5H_{10}$. As the molar ratio of dihydroxy compound to silicon compound employed is decreased the average number of cross-links per silicon atom will again increase until, when the limiting molar ratio of reagents of 2:1 is reached, the resultant product will contain no —O-R''—OH groups attached to silicon but will consist entirely of a mixture of molecular species of average composition $[Si(O-R''-O)_2]_d$ where d is a positive integer.

Our invention is further illustrated by the following examples in which all parts and percentages are by weight except where otherwise stated.

EXAMPLE 1.

A solution of 603 parts of di-(2-hydroxy-n-propyl) ether in 750 parts of toluene was heated under reflux, dried by azeotropic distillation and cooled to 12°C. 149.5 parts of methyltrichlorosilane were added to the solution with vigorous stirring over a period of 20 minutes the temperature of the reaction mixture during addition being maintained in the range 12°–20°C by cooling. The mixture was then stirred at 20°–25°C for 1 hour after which it was heated to reflux temperature over a period of 30 minutes with a brisk stream of nitrogen passing continuously through the mixture. Heating under reflux and purging of the mixture with nitrogen was continued for 3 hours after which time the off-gases were acid free. Toluene was then removed by distillation at a temperature of 100°C and 10 mm. Hg pressure to leave 635 parts of a clear colourless mobile oil. The molar ratio of di-(2-hydroxy-n-propyl) ether to methyltrichlorosilane employed was 4.5:1. The product contained no detectable free acidity (i.e. <5 p.p.m. as HCl) as determined by heating a sample under reflux with water/acetone (80/20) for 20 minutes and titrating to bromothymol blue with N/100 aqueous sodium hydroxide solution.

The antifoam properties of the products were tested as follows:

50 ml of a 0.25 percent aqueous solution of a secondary alkylsulphate surfactant (Teepol X) was placed in a 100 ml beaker of base diameter 50 mm. A fine stream of air bubbles was blown through the solution by means of a 20 mm diameter No. 3 sintered glass bubbler placed at the bottom of the solution. The air flow rate was such that the foam formed took one minute to reach the top of the beaker (i.e. a foam height of 30 mm). An air flow rate of about 60 ml per minute was required to produce this effect. When the top of the foam was level with the top of the beaker 0.1 ml of the material under test was spread from a 1 ml pipette on to the surface of the foam. The foam subsided immediately and took 2 minutes to reconstitute (i.e. reach the top of the beaker again).

In addition to the test described above the product was examined in a biochemical fermentation process as follows:

A solution was prepared containing 35 g of sugar in 140 g of water. To this solution were added 25 g of concentrated fruit juice (pineapple and peach juices) and 0.5 g of baker's yeast. The mixture was stirred well in a 500 ml covered flask and allowed to ferment whilst maintained at a temperature of 24°–27°C. After 17 hours, steady evolution of carbon dioxide was occurring and a white foam covered the entire surface of the liquid. After 31 hours, the foam was still present over the entire surface, and a total of 1100 ml of carbon dioxide had been evolved.

A similar mixture treated at the start with 0.2 g of the product prepared as described above evolved carbon dioxide, but produced no foam on the surface of the liquid. After 17 hours, the surface of the liquid was completely free of foam, and remained so after 31 hours, by which time a total of 1430 ml of carbon dioxide had been evolved.

A laboratory scale batch culture of a methanol oxidisable organism to produce single cell protein was carried out. The use of 0.1 per cent by volume of the product prepared as described above controlled surface foam without adversely affecting the bubble size and air distribution in the mass. There was also no toxic effect on the culture and no decrease in the yield of protein.

EXAMPLES 2 – 4.

Products were prepared by a process similar to that of Example 1 from di-(2-hydroxy-n-propyl) ether and methyltrichlorosilane in the molar proportions given below. Reactions were carried out at 50 percent concentration in toluene. Details of the products obtained are also given below together with the results of testing the antifoam properties in the manner described in Example 1.

| Example | Molar proportion di-(2-hydroxy-n-propyl)ether: methyltrichlorosilane | Product Appearance | Product Viscosity (cS at 25°C) | TIME (Seconds) Foam Subsidence | TIME (Seconds) Foam Reconstitution |
|---|---|---|---|---|---|
| 2 | 3.0:1 | Clear, colourless | 84 | Immediate | 120 |
| 3 | 2.2:1 | Clear, colourless | 78 | do. | 120 |
| 4 | 1.53:1 | Clear, colourless | 202 | do. | 120 |

EXAMPLE 5.

The procedure of Example 1 was used to prepare a product from 114.0 parts of 1,2-dihydroxypropane, $CH_3CH(OH)CH_2OH$, and 74.75 parts of methyltrichlorosilane in 189 parts of toluene. This represents a molar ratio of 1,2-dihydroxypropane to methyltrichlorosilane of 3.0:1. 70 parts of product was obtained as a clear colourless oil of viscosity 526 centistokes at 25°C. It was found in testing in the manner described in Example 1 that the foam subsided in 20 seconds and was reconstituted in 3.5 minutes.

EXAMPLE 6.

The procedure of Example 1 was used to prepare an anti-foam product from 294 parts of di-(2-hydroxy-n-propyl) ether and 211.5 parts of phenyltrichlorosilane in 506 parts of toluene. This respresents a molar ratio of di-(2-hydroxy-n-propyl) ether to phenyltrichlorosilane of 2.2:1. 74 parts of product was obtained as a clear colourless oil of viscosity 362 centistokes at 25°C. Testing in the manner described in Example 1 gave partial foam subsidence in 15 seconds and reconstitution in 1 minute.

EXAMPLE 7.

A mixture of 120.6 parts of di-(2-hydroxy-n-propyl) ether and 35.6 parts of methyltriethoxysilane was heated for two hours to a temperature of 110°–120°C whilst purging with a brisk stream of nitrogen. This represents a molar ratio of do-(2-hydroxy-n-propyl) ether to methyltriethoxysilane of 4.5:1. The off-gases were condensed in an ice/water cooled tap. The mixture was distilled for 30 minutes at a temperature of 110°–120°C and a pressure of 10 mm. Hg, the condensate being collected in a cooled trap. A combined total of 25.9 parts of condensate were collected which were found to consist entirely of ethanol. The residue consisted of 130.2 parts of a clear, colourless liquid of viscosity 113.0 cS at 25°C. Testing in the manner described in Example 1 gave immediate foam subsidence and 5 minutes were required for reconstitution.

EXAMPLE 8.

A minute of 268 parts of di-(2-hydroxy-n-propyl) ether and 104 parts of tetraethoxysilane was heated for 5 hours to a temperature of 160°–200°C whilst purging with a slow stream of nitrogen. During that time 68.4 parts of distillate were removed. Thereafter heating was continued at 100°C for 30 minutes during which time a further 13.5 parts of material were distilled off at a pressure of 10 mm. Hg. The total 81.9 parts of distillate were found to consist entirely of ethanol. The residue consisted of 275.3 parts of a clear colourless liquid of viscosity 196 cS at 25°C. Testing of the product in the manner described in Example 1 gave 5 seconds for subsidence and 3.5 minutes for reconstitution.

What we claim is:

1. Organosilicon compounds of the general formula

$(R_aSi)_xO_{x(r-a)}[(C_nH_{2n}O)_yH]_zA_{x(4-a)-z/2\ trap.}$ where R is an alkyl, aryl and alkenyl group; A is the group $[(C_nH_{2n}O)_{y-1}C_nH_{2n}]$ or $(C_5H_{10})$ where n is an integer from 2 to 4 and y is an integer from 1 to 5; $a$ is 0 or 1; $x$ is an integer from 1 to 10; and $z$ is an integer which when a is 1 is not greater than $x + 2$ and when a is 0 is not greater than $2x + 2$.

2. Compounds according to claim 1 wherein the group R contains not more than 10 carbon atoms.

3. Compounds according to claim 2 wherein the group R is selected from the group consisting of methyl and phenyl groups.

4. Compounds according to claim 1 wherein z is not less than $x$.

5. A process for the production of compounds claimed in claim 1 comprising reacting a silicon halide selected from the group consisting of silicon tetrachloride and organotrichlorosilanes of the formula $RSiCl_3$ with a dihydroxy compound.

6. A process for the production of compounds claimed in claim 1 comprising transesterifying an alkoxysilane selected from the group consisting of tetraalkoxysilanes, organotrialkoxysilanes with a dihydroxy compound.

7. A process according to claim 6 wherein the alkoxy groups are so chosen that the free alcohol produced is of lower boiling point than the dihydroxy compound used.

8. A process according to claim 6 wherein the alkoxysilanes selected from the group consisting of alkoxysilanes of the formula $Si(OR')_4$ and $RSi(OR')_3$ where R' is selected from the group consisting of methyl, ethyl, isopropyl, n-butyl groups and R is selected from the group consisting of methyl and phenyl groups.

* * * * *